United States Patent [19]
Kaneko

[11] 3,752,019
[45] Aug. 14, 1973

[54] HIGH SPEED AUTOMATIC LATHE
[75] Inventor: Yoshitada Kaneko, Okaya, Japan
[73] Assignee: Kabushiki Kaiska Suwa Seikasha, Tokyo, Japan
[22] Filed: July 27, 1971
[21] Appl. No.: 166,357

[52] U.S. Cl. .................................... 82/28 R, 279/4
[51] Int. Cl. ............................................ B23b 19/00
[58] Field of Search .............. 82/28, 30; 279/4, 279/43, 50, 57

[56] References Cited
UNITED STATES PATENTS
| | | | |
|---|---|---|---|
| 1,185,681 | 6/1916 | Kienzle | 82/28 |
| 3,168,322 | 2/1965 | Dziedzic | 279/4 |
| 3,643,969 | 2/1972 | Finley | 279/4 |

FOREIGN PATENTS OR APPLICATIONS
| | | | |
|---|---|---|---|
| 842,147 | 6/1952 | Germany | 82/28 |

*Primary Examiner*—Leonidas Vlachos
*Attorney*—Alex Friedman, Harold I. Kaplan et al.

[57] ABSTRACT

A high speed automatic lathe having a chuck which can rotate at high speeds without vibration such as would cause damage to the quality of work turned out thereby. The chuck is of the collet type and is circumferentially symmetrical so that possible causes of vibration are absent.

2 Claims, 2 Drawing Figures

HIGH SPEED AUTOMATIC LATHE

BACKGROUND OF THE INVENTION

With the objective of increasing the output of automatic lathes it is desirable to increase the rotation speed at which they operate and thereby the cutting speed. Up to the present time rotation speed for most automatic lathes has been limited to 7,000 to 8,000 rpm. Attempts to raise the speed of rotation has resulted in vibration of the spindle and decrease in tool life, processing precision, and machine life.

Chucking devices used up to now for high-speed lathes have been a toggle type and a fluid-operated type using air pressure or oil pressure. In the toggle type, vibration is generated by the presence of the unbalanced toggle which causes pressure against bearings and in consequence, shortens life. The fluid-operated type, while introducing no problem of unbalance, has introduced a sealing problem. In the constructions used to date, leakage has almost invariably been encountered. Th difficulty arises from the need to effect a satisfactory seal between a fixed portion and a rotating portion of the pressure device. Moreover, for high speed rotation, the life of the sealing means has been unsatisfactorily short.

SUMMARY OF THE INVENTION

A chuck which can be rotated at high speed without vibration and without leakage of fluid includes a collet, a chuck sleeve and a spindle where the spindle is coaxial with and fixed to a rotor and the rotor is surrounded by a stator. The stator is fixed in a headstock frame so that the motor is, in effect, integral with the headstock. As a result, the motor, the spindle, the chuck sleeve and the collet can rotate at high speed without vibration. A biasing means placed between the chuck sleeve and the spindles displaces the chuck sleeve in a direction such that it grips the collet and closes it upon a workpiece. To remove a workpiece from the collet or to move a workpiece axially through the collet, the chuck sleeve is moved against the urging of the biasing means so as to permit the collet to open and release the workpiece Movement of the chuck sleeve in this direction relative to the spindle is effected by a displacing means such as a piston in a cylinder or by a solenoid and armature. The displacing means rotates with the spindle and chuck sleeve.

Accordingly, an object of the present invention is to provide a chuck rotatable at higher speeds than has hitherto been possible.

Another object of the invention is to provide a chuck rotatable at high speeds while free of vibration which would shorten tool life and decrease the precision of workmanship.

A further object of the invention is to provide an automatic lathe with a chuck rotatable at higher speeds than hitherto has been possible, thereby increasing cutting speed and production.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawing, in which.

DESCRIPTION OF THE PREFERRED EMBODIMENT

Figure 1:
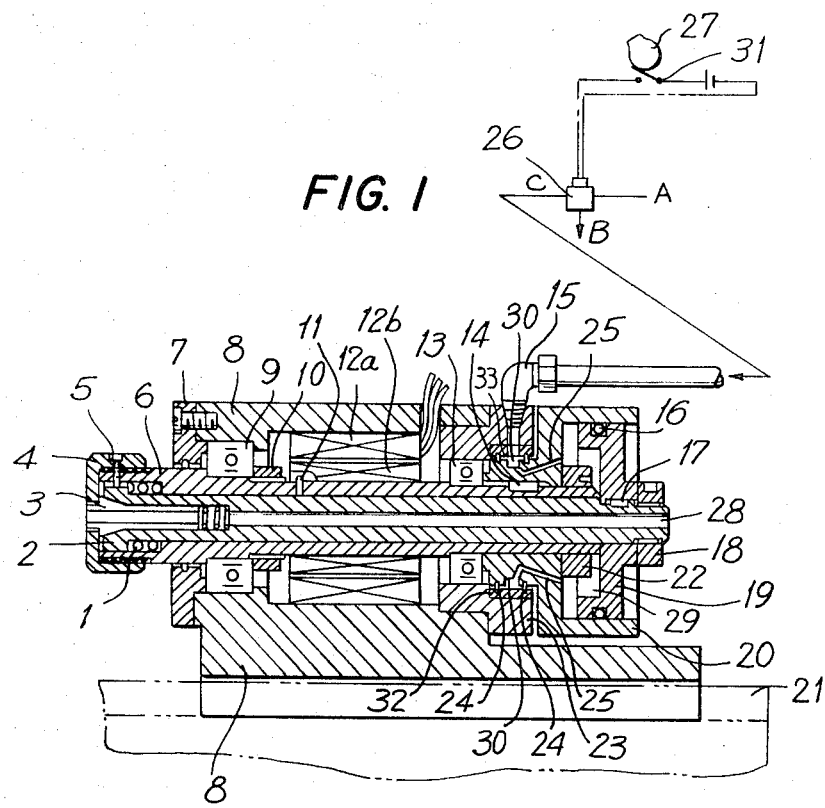
FIG. 1 shows in longitudinal section an automatic lathe chuck in accordance with the present invention.
Figure 2:
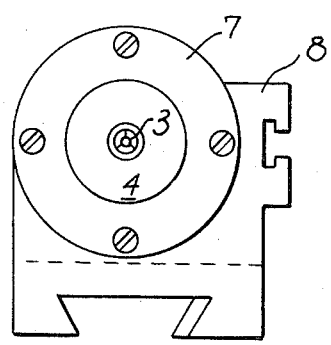
FIG. 2 shows an end view of the same chuck.

In a high speed automatic lathe chuck in accordance with the present invention to hollow spindle 6 has within it a chuck sleeve 2. The chuck sleeve 2 grasps a collet chuck 3 in closed position, that is to say, when holding a workpiece (not shown). The collet chuck 3 is held to the spindle 6 by means of a spindle cap 4. The chuck sleeve 2 is urged to the left by biasing means 1, in this case a spring. As a result of the flexibility of the spring 1, the chuck sleeve 2 can be displaced axially to the right.

The spindle 6 is mounted rotatably on a headstock frame 8 by bearings 9 and 13. A rotor 12b keyed by key 11 to spindle 6 cooperates with a stator 12a fixed to headstock frame 8. The bearing 9 is fixed to headstock frame 8 by bearing fixing plate 7 and screw 10. Bearing 13 is fixed to the headstock frame 8 by bearing support 23. The combination of stator 12a fixed to the headstock 8 and rotor 12b fixed to the spindle 6 which is supported by the bearings 9 and 13 results in a motor drive combination which is free of vibration at extremely high speeds. Variation in rotation speed is provided by a frequency changer (not shown).

Pipe 15 supplies pressurized fluid, preferably compressed air, through bearing support 23 and bearing side connector 32 to passages 25 traversing cylinder wall 20. Cylinder 20 is fixed to spindle 6 by key 14 and is held in position by nut 22. Pressurized fluid enters space 29 formed between piston 19 and cylinder 20. Piston 19 is fixed to chuck sleeve 2 by key 17 and is held in position by nut 18. Introduction of fluid into space 29 at sufficiently high pressure moves the chuck sleeve 2 against the pressure exerted by spring 1 and opens collet 3 for displacement of work inserted through hollow 28 in chuck sleeve 2.

Seal between piston 19 and cylinder 20 is effected by O-ring 16. Seal between bearing side connector 32 and cylinder 20 is effected by packing 24 having a labyrinthine shape.

Pipe 15 may be supplied with air from pipe A through valve 26. When the valve 26 is open air from pipe A travels through pipe C toward pipe 15. Pipe B serves for venting of air. Valve 26 is controlled by cam 27 through switch 31.

To operate the chuck, headstock 8 is moved into proper position on bed 21 by means which are not shown. Cam 27 is rotated to close switch 31 opening valve 26 so that air is introduced into the cylinder and the chuck is thereby opened. A workpiece in the form of a bar is inserted through passage 28 into collet 3. Cam 27 rotates further opening switch 31 and venting air from the cylinder out through outlet B. The chuck closes, the workpiece is machined and cut off, cam 27 re-opens valve 31, the cylinder is pressurized, the workpiece is moved forward by a predetermined amount, pressure is vented from the cylinder and the process continues, the spindle with the chuck sleeve and collet rotating throughout.

Since the motor is fixed inside the headstock frame, loading on the bearings is small and the rotation of the spindle is uniform resulting in increased precision of machining and increased length of life for the machine. Moreover, since the spindle is coaxial with the motor there is no noise of driving gears, or belt drive.

In contrast with the toggle type chuck, the chuck sleeve is operated only when the chuck is being opened, since the spring takes care of closing the collet. Also the centrifugal force which causes the toggle type chuck to vibrate is completely absent since the system is dynamically symmetrical. The fact that the chuck sleeve moves only axially during operation of the collet means that loading of the bearings during opening and closing of the collet is absent.

The movement of the chuck sleeve relative to the spindle and the collet could also be effected electrically. Thus, an electromagnetic coil could be mounted on the end of the spindle and an armature coaxial with the coil could be mounted on the chuck sleeve. Sliding contacts would, of course, be necessary.

In the absence of a toggle and the cam and lever necessary to operate such a device, remote control becomes possible, as is indicated in FIG. 1.

In a high speed chuck of the present invention, a sealing member such as the conventional connector for fluid is not used. Also, a gap 33 is provided so that rotating cylinder 20 and stationary bearing side connector 32 do not touch each other; consequently, it is unnecessary to supply oil to parts rotating at tens of thousands of rpm so that there is no wear from this factor. Consequently, maintenance is simply and easy and reliability is high. In accordance with the present invention, if a bearing side connector is in a body with a bearing holder or is constructed separately, the same effect is obtained.

The chuck of the present invention is not restricted to high speed automatic lathes, but is also suitable for use in lathes operating at more conventional speeds.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A chuck for high speed automatic lathe comprising a headstock frame, a spindle rotably mounted in said frame, a chuck sleeve slidably mounted in said spindle, a collet within said chuck sleeve for holding a workpiece, said collet being fixed to said spindle proximate one end thereof, biasing means urging said chuck sleeve in one axial direction, the direction being such as to cause said collet to close and remain in closed position, a motor rotor fixed to said spindle, a motor stator fixed to said frame bearings in said frame exterior to said motor and holding said spindle for rotation therein; a cylinder member having a head at one end thereof, a skirt fixed to said head end and attached to said spindle for rotation therewith, said skirt having an annular groove around the outer periphery thereof and having a conduit therein connecting said groove with the interior of said cylinder member, a piston member in said cylinder, said piston member being attached to said chuck sleeve for rotation therewith and fitting sealingly and slidably in an axial direction within said cylinder member, a source of pressurized fluid attached to said frame, and gasket means within said frame disposed proximate to said skirt on both sides of said groove for minimizing leakage of presurized fluid between said gasket and said skirt, said gasket being apertured and said source of pressurized fluid being so located in said frame that fluid can pass in either direction between said source and the interior of said cylinder member through said gasket aperture, said skirt groove and said skirt conduit.

2. The clutch as defined in claim 1 further comprising vent means for venting pressurized fluid from said cylinder member, and switching means for selectively pressurizing said cylinder means to open said chuck cleeve, and venting said cylinder member thereby permitting said piston means to move toward said head end of said cylinder means under the urging of said biasing means for closing said chuck sleeve.

* * * * *